US00RE37136E

(19) United States
(12) Reissued Patent
Vezard

(10) Patent Number: US RE37,136 E
(45) Date of Reissued Patent: Apr. 17, 2001

(54) TUNABLE HIGH INTENSITY FORENSIC LIGHT

(75) Inventor: Nicholas Vezard, Metuchen, NJ (US)

(73) Assignee: Instruments SA, Inc., Edison, NJ (US)

(21) Appl. No.: 09/275,895

(22) Filed: Mar. 24, 1999

Related U.S. Patent Documents

Reissue of:
(64) Patent No.: 5,613,752
Issued: Mar. 25, 1997
Appl. No.: 08/279,229
Filed: Jul. 22, 1994

(51) Int. Cl.[7] ..... F21V 8/00
(52) U.S. Cl. ..... 362/583; 362/284; 362/293; 362/294
(58) Field of Search ..... 356/419; 362/282, 362/284, 293, 322, 324, 393, 552, 572, 573, 574, 575, 577, 583, 294

(56) References Cited

U.S. PATENT DOCUMENTS 4,123,172 * 10/1978 French ..... 362/551
4,454,568 * 6/1984 Stadnik ..... 362/293
4,613,931 * 9/1986 Messinger ..... 362/373
4,907,133 * 3/1990 Nath ..... 362/318
5,003,434 * 3/1991 Gonser et al. ..... 362/573
5,099,399 * 3/1992 Miller et al. ..... 362/294
5,109,461 * 4/1992 Churchill ..... 362/575
5,243,410 * 9/1993 Larson et al. ..... 362/558

FOREIGN PATENT DOCUMENTS

5151807 * 6/1993 (JP) ..... 362/32

* cited by examiner

*Primary Examiner*—Y. Quach
(74) *Attorney, Agent, or Firm*—Handal & Morofsky

(57) ABSTRACT

In accordance with the present invention an improved forensic light source comprising a source of light and support structure for supporting the source of light is provided. A light guide having first and second ends is coupled to the source of light at the first end to receive light from the source of light and transmit the light to the second end. The light guide is mounted on the support structure. A filter support member supports a plurality of filters. A movable light directing assembly is mounted on the second end of the light guide for movably supporting the filter support member for movement to a plurality of positions. Each of the positions corresponds to the coupling of a selected one of the filters to the second end, whereby the light is filtered by the selected filter. A heat sink may be coupled to the first end of the light guide.

33 Claims, 13 Drawing Sheets

TUNABLE HIGH INTENSITY FORENSIC LIGHT

Matter enclosed in heavy brackets [ ] appears in the original patent but forms no part of this reissue specification; matter printed in italics indicates the additions made by reissue.

TECHNICAL FIELD

The present invention relates to light sources for illuminating forensic depositions or other evidence with an improved light cable for transmitting selectable wavelength ranges.

CROSS-REFERENCE TO RELATED APPLICATIONS

This application is related to U.S. patent application of Purcell Ser. No. 08/076,916, filed Jun. 14, 1993, U.S. Pat. No. 5,515,162 and entitled "LOW NOISE LIGHT SOURCE FOR FORENSIC EXAMINATION", and U.S. patent application Ser. No. 08/227,962, which is abandoned, the subject matter of which are hereby incorporated herein by reference.

BACKGROUND

Starting at the end of the nineteenth century, crime fighters began to use and develop what has grown into a substantial body of technological tools designed to detect and/or enhance physical evidence. One of the earliest techniques of this kind to receive widespread application is the dusting of fingerprints. Light sources were also among the first tools used in this field. Hence the classic icon of the gumshoe, flashlight in hand, searching for evidence at the dimly lit crime scene.

When a fingerprint is fresh, the oil which forms the print generally follows the pattern of the fingerprint ridges in the finger which made the print. If a fine dust is applied to the surface of a fresh print, the dust tends to adhere to the oils in the fingerprint, thus forming a pattern which generally reveals the pattern of the fingerprint.

Fingerprint dusts were initially selected for their color contrasting qualities as compared to the background. Thus white dust was used to enhance a fingerprint on a black object and vice versa. Even where the oils of a fingerprint have lost their tackiness due to aging or other phenomena, the amino acids into which they break down do cause a minute etching of many surfaces. While this etching is often not visible to the naked eye, and may not become visible with the application of a colored powder, extremely fine fluorescent dusting powders will reveal the fingerprint pattern when illuminated under high intensity light.

Today, many materials, such as dyes, in addition to fluorescent dusting powders are used. Inspection of the evidence is done with specialized light sources. These light sources usually comprise a high intensity source and a filter which passes light having a limited range of wavelengths. Depending upon the material used, which material may be either a fluorescent dusting powder, dye, or other marker material, light having a wavelength which substantially coincides with a known excitation wavelength of the marker is employed. The characteristic of the marker is that, upon illumination with light at one of its excitation wavelengths, it will fluoresce, or emit light. Such fluorescence is typically at a longer wavelength as compared to the excitation wavelength.

Examination of evidence is also enhanced through the use of color filtering glasses or barrier filters, whose color filtering characteristics are tuned to maximize the image to be detected. As noted above, the excitation wavelength is varied through the use of filters at the source. While such devices are very efficient in filtering light, every filter has its own fixed characteristics. These include its center wavelength, bandwidth and transmission coefficient. Thus, if one wishes to have flexibility, it is necessary to have a wide range of filters having different center wavelengths and different bandwidths. This is both cumbersome and expensive. Moreover, as new dyes and powders are introduced, old filters can become obsolete or unnecessary.

In an attempt to provide convenience and flexibility, some light sources used for forensic examination come with a mechanical filter assembly, which allows the introduction of one of about a half dozen filters into the path of the light source to provide the desired wavelength illumination. While this does solve the problem of providing a convenient and easy way to use a light source, obsolescence and limited wavelength and bandwidth selection remain.

In an attempt to overcome some of these disadvantages, earlier forensic illumination systems have attempted to achieve a measure of tunability by mounting an interference filter for angular rotation. Generally, such angular rotation results in a change in angle of incidence with respect to the filter input and a relatively small variation in the encountered path length between the functional layers in the interference filter for light passing through the filter in a fixed direction. In accordance with Bragg's Law, this results in different wavelengths being passed by the filter.

In the above-referenced disclosure of Purcell, a system is disclosed which provided a high intensity light source which is continuously adjustable to vary the center frequency of a band of wavelengths. At the same time, the flexibility of varying the bandwidth of this band was also possible. The same was done with a single light source and a single filtering apparatus. At the same time that was achieved with a mechanical configuration that is both reliable and rugged. Finally, that system was easily portable, and capable of outputting light sufficient for close up analysis of surfaces bearing such material as oils, semen, blood and so forth.

In that system, a method and apparatus for illuminating a deposition of organic material such as, blood, sweat or oil for forensic examination was also provided. A light source emitted light having a range of wavelengths. A first optical coupler or light pipe was positioned and configured to reflect the light toward a reflective diffraction grating. A supportable structure supported, at a selectable relative position, an exit slit and the grating to pass a desired band of wavelengths of output light from portions of the light reflected by the grating. A bendable second optical coupler was coupled to the exit slit and directed the output light toward the deposition to be examined. The bendable second optical coupler comprised a liquid fiber optic member. The support structure rotated the grating. An electronic control and a hand held remote control pad was coupled to the support structure and controlled the support structure.

As can be seen from the above, numerous advantages are provided in such a continuously adjustable diffraction grating based system. Naturally, it is desirable to have the possibility of the highest possible intensity output light at the selected wavelength. However, such a brute force approach results in increased power consumption and excessive heat energy, stressing the rest of the system. In an attempt to achieve better results without aggravating this problem, the above disclosure of Purcell utilizes an infrared blocking filter to filter the light source thus allowing only filtered and relatively low intensity light to fall on the grating. This, however, also has an adverse impact on the amount of energy output by the forensic light source, particularly in the ultraviolet range. In addition, the use of the filters, because they are exposed to a high intensity source, results in there being another element subject to deterioration and replacement.

In accordance with the latter of the two above applications, a filter is used to achieve maximum throughput of energy. Improved signal-to-noise ratio is achieved using other filters at the detection end. In order to protect the filters at the light output side, protection is provided by infrared reflecting filters which reflect unwanted infrared radiation away from the bandpass filters used in the system. However, they also attenuate the desired output light. These bandpass filters are located in the housing and relatively proximate to the source of light which is filtered to output the desired filtered light at the selected wavelength.

SUMMARY OF THE INVENTION

In accordance with the present invention an improved forensic light source comprising a source of light and support structure for supporting the source of light is provided. A light guide having first and second ends is coupled to the source of light at the first end to receive light from the source of light and transmit the light to the second end. The light guide is mounted on the support structure. A filter support member supports a plurality of filters. A movable light directing assembly is mounted on the second end of the light guide for movably supporting the filter support member for movement to a plurality of positions. Each of the positions corresponds to the coupling of a selected one of the filters to the second end, whereby the light is filtered by the selected filter.

The filter support member comprises a wheel with a plurality of filters mounted around a point of rotation. Mounting structure is provided for rotatably mounting the wheel for rotation about the point of rotation.

The filter support member defines a plurality of detentes and further comprises a spring member mounted on the movable light directing assembly. It is positioned to releasably engage the detentes. The detentes are positioned to correspond to alignment between one of the filters and the second end, when engaged by the spring member, each of the detentes corresponding to a respective one of the filters.

The source of light may be a xenon lamp, a tungsten lamp or a metal halide lamp. A heat sink may be coupled to the first end of the light guide. The light guide may be a liquid light guide or a fiber optic light guide. A lens for focussing light from the second end through a selected filter may be provided and a securing member may be used to adjust the position of the second end relative to the lens.

BRIEF DESCRIPTION OF THE DRAWINGS

One way of carrying out the invention is described in detail below with reference to drawings which illustrate only one specific embodiment of the invention and in which.

DETAILED DESCRIPTION OF THE PREFERRED EMBODIMENTS

Figure 1:
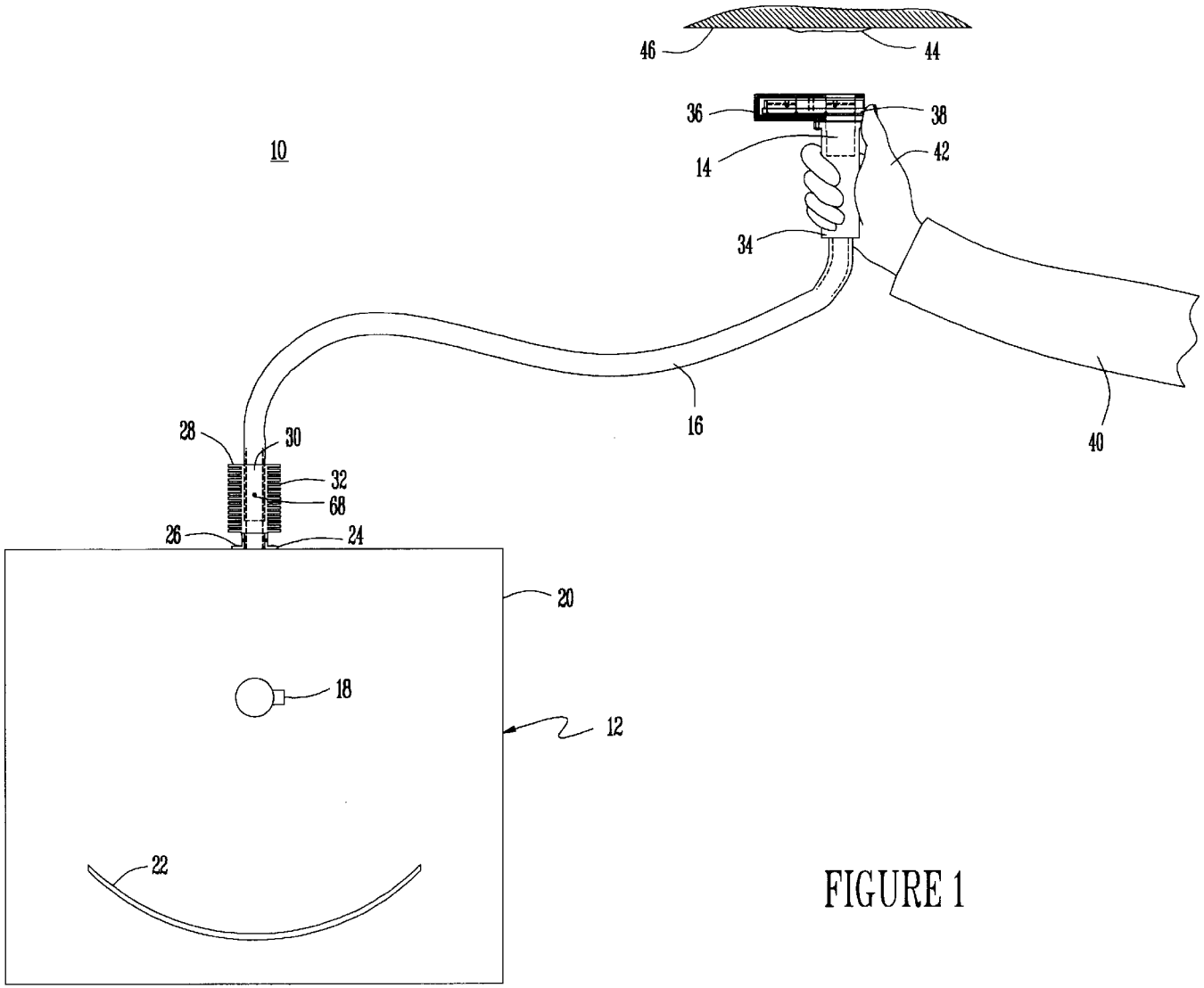
FIG. 1 is a schematic view of a forensic light source constructed in accordance with the present invention.

Referring to FIG. 1, a forensic deposition illumination system 10 constructed in accordance with the present invention is illustrated. System 10 generally comprises a light source 12 contained in a housing 20, a hand held light directing assembly 14, and a fiber optic cable 16 optically coupling the light source 12 to the hand-held light directing assembly 14.

Light is supplied to the system by a lamp 18 located within housing 20 of light source 12. Light from lamp 18 is focused by a parabolic reflector 22 also contained within housing 20. In accordance with conventional technology, housing 20 may also contain a fan for cooling the assembly and an appropriate power supply for lamp 18. In this respect, reference is made to the above-identified patent applications.

Housing 20 of light source 12 is provided with a flange 24 which is secured to housing 20 by a pair of screws 26, as illustrated in FIG. 1. Mounted to flange 24 is a heat sink 28 which comprises a main body 30 and heat dissipating fins 32, as can be seen most clearly in FIGS. 2 and 3.

Hand-held light directing assembly 14 includes a handle portion 34 and a filter housing portion 36. Protruding from filter housing portion 36 is a rotatable filter wheel 38.

During use, a user 40 grasps the handle portion 34 in his hand 42 and aims the light at a deposition 44 to be examined. Deposition 44 may be located on a surface 46.

Figure 2:
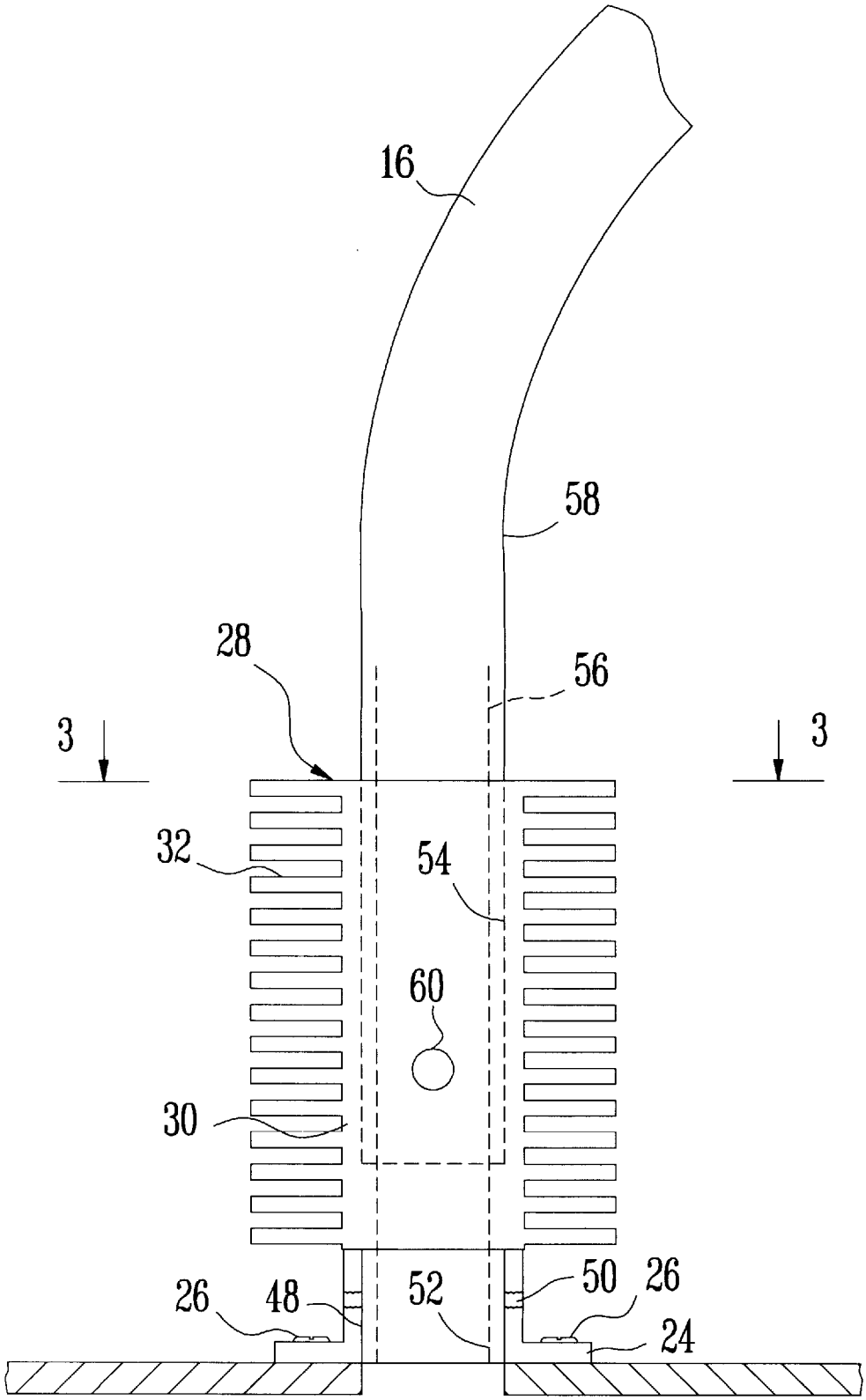
FIG. 2 is a detailed view of the coupling between the fiber optic light guide and the light source.
Figure 3:
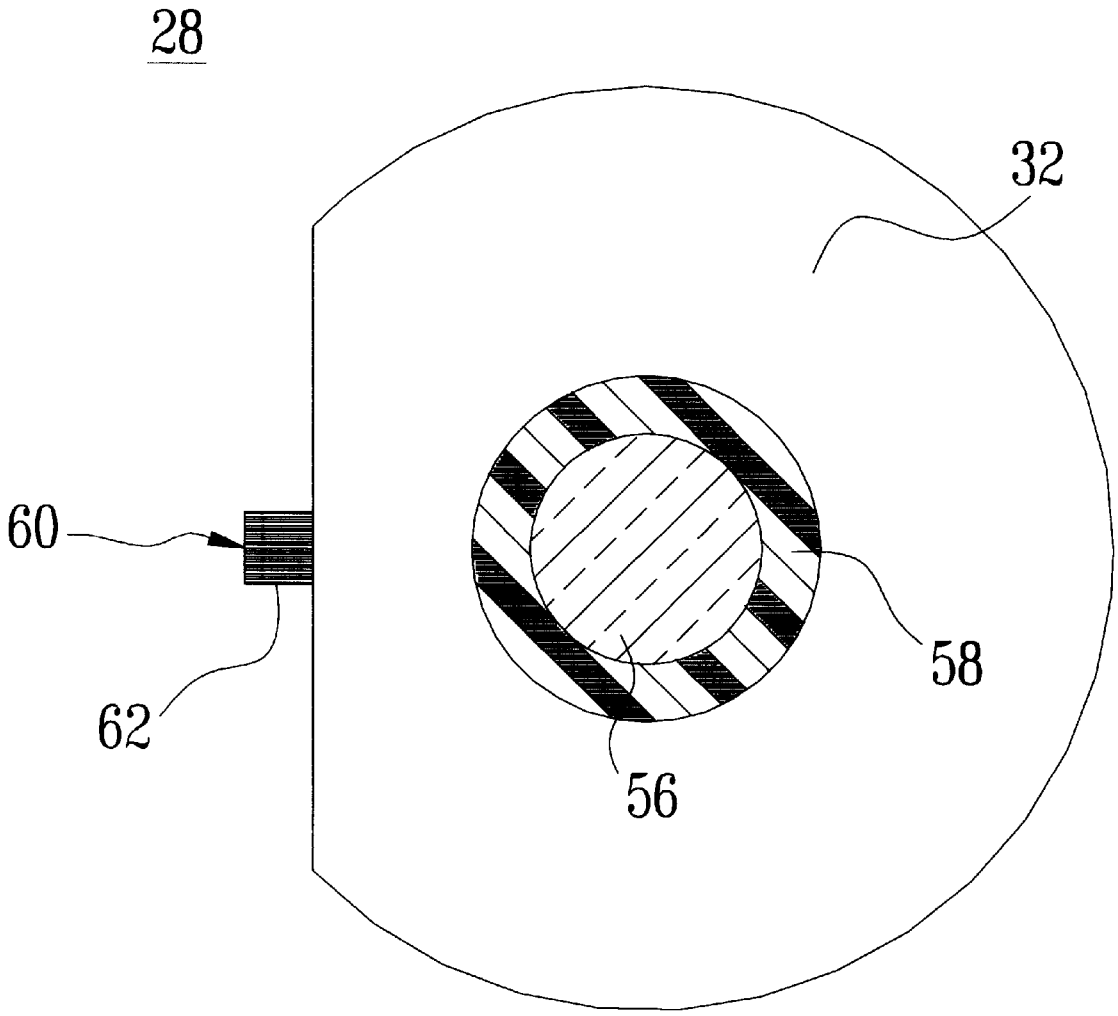
FIG. 3 is a view along lines 3—3 of FIG. 2 illustrating the heat sink of the system of the present invention.

Referring to FIGS. 2 and 3, the construction of the heat sink 28 may be more clearly understood. In particular, heat sink 28 may be machined out of a single piece of aluminum. Heat sink 28 may be finished with a black anodized finish. Heat sink 28 includes a tubular forward portion 48 which mounts into flange 24 and may be permanently secured thereto using set screws 50. Heat sink 28 includes an inner bore 52 which communicates optically with light from lamp 18 as reflected by reflector 22. Lamp 18 may be of any conventional type such as of the incandescent, metal halide, or xenon type.

A larger bore 54 is located at the opposite end of heat sink 28 and is sufficiently large to accommodate the fiber optic cable 16. Generally, fiber optic cable 16 includes an inner fiber optic member 56 and a sheathing 58. The diameter of the inner fiber optic member 56 substantially equals the diameter of smaller bore 52, while the outside diameter of sheathing 58 substantially matches the inside diameter of bore 54. Fiber optic cable 16 is maintained and positioned in bore 54 by a set screw 60 which has a large knurled head 62 (FIG. 3) which allows set screw 60 to be easily and conveniently grasped by the fingers of a user. During use, fiber optic cable 16 is inserted into bore 54 and set screw 60 is tightened in position thereby securing fiber optic cable 16 in position.

Figure 4:
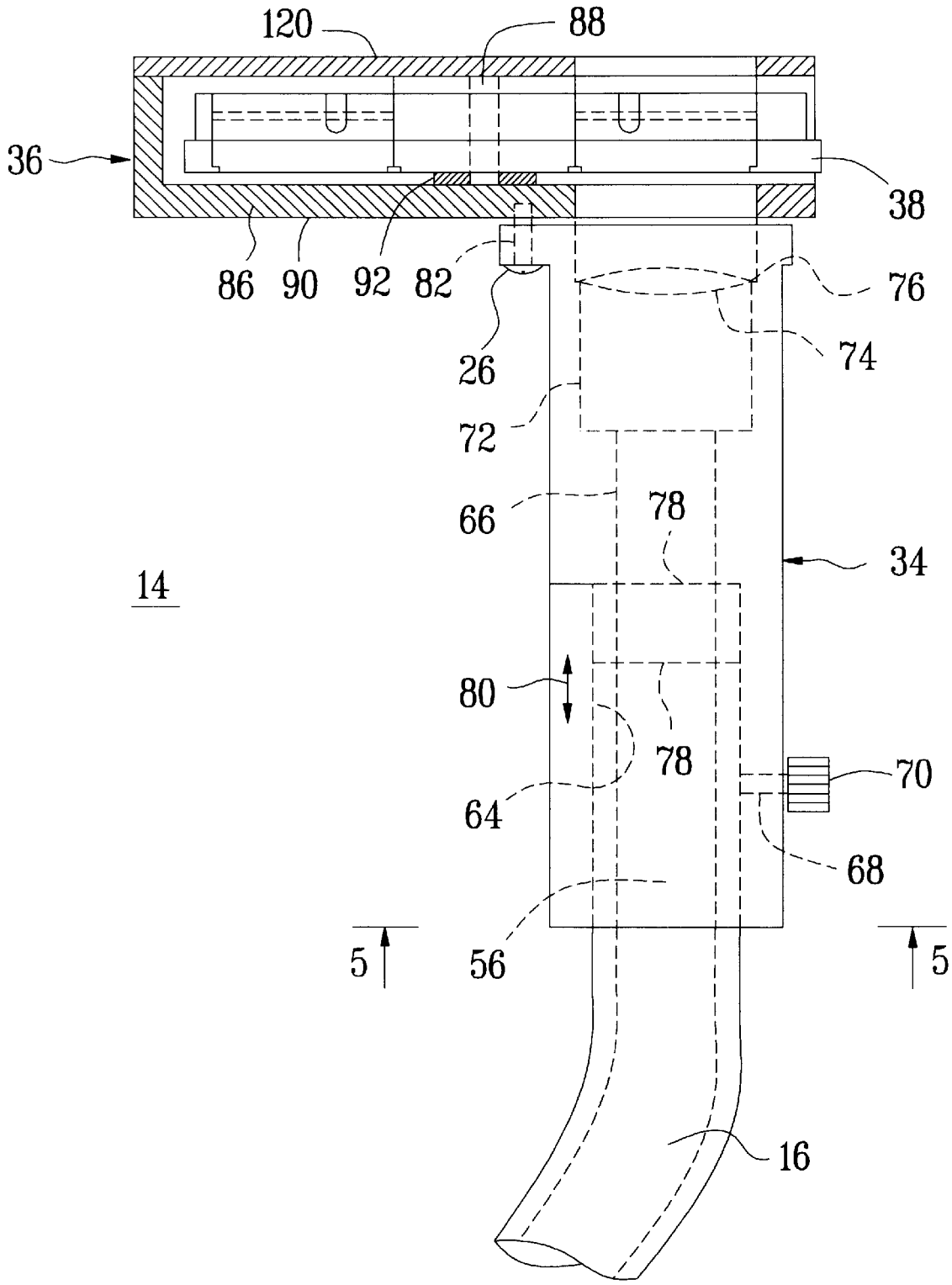
FIG. 4 is a view partially in cross section of a hand-held light directing assembly constructed in accordance with the invention.

Referring to FIG. 4, the construction of the hand-held light-directing assembly 14 may be most clearly understood. In particular, assembly 14 comprises a handle portion 34. Handle portion 34 includes a light guide receiving bore 64 which is in optical communication with a central bore 66. Central bore 66 is of a diameter which matches the diameter of inner fiber optic member 56. This enables the handle to communicate substantially all of the light conducted by fiber optic cable 16. Fiber optic cable 16 is maintained in position by a hand adjustable set screw 68 with a knurled head 70. During use, fiber optic cable 16 is inserted into bore 64 and held in position by set screw 68.

Handle portion 34 also includes a lens receiving bore 72. A lens 74 is mounted on an annular shoulder 76 in bore 72. Lens 74 focusses the output light at the output end 78 of fiber optic cable 16.

During use, selective focussing of the output from end 78 of fiber optic cable 16 may be achieved by varying the position of end 78 in the directions shown by arrow 80 and setting the position of fiber optic cable 16 using set screw 68. For example, end 78 may be brought to the position shown in phantom lines in FIG. 4. Variation of the position of end 78 will result in varying light output cone diameters and varying intensities. High intensity corresponds to smaller diameter light outputs, while larger diameter outputs will result in lower intensity. The advantage of the lower intensity outputs is that wider areas may be illuminated and the same may be particularly useful in searching operations. On the other hand, minute examination of a deposition may require use of a relatively small diameter high-intensity spot of illumination.

Figure 5:
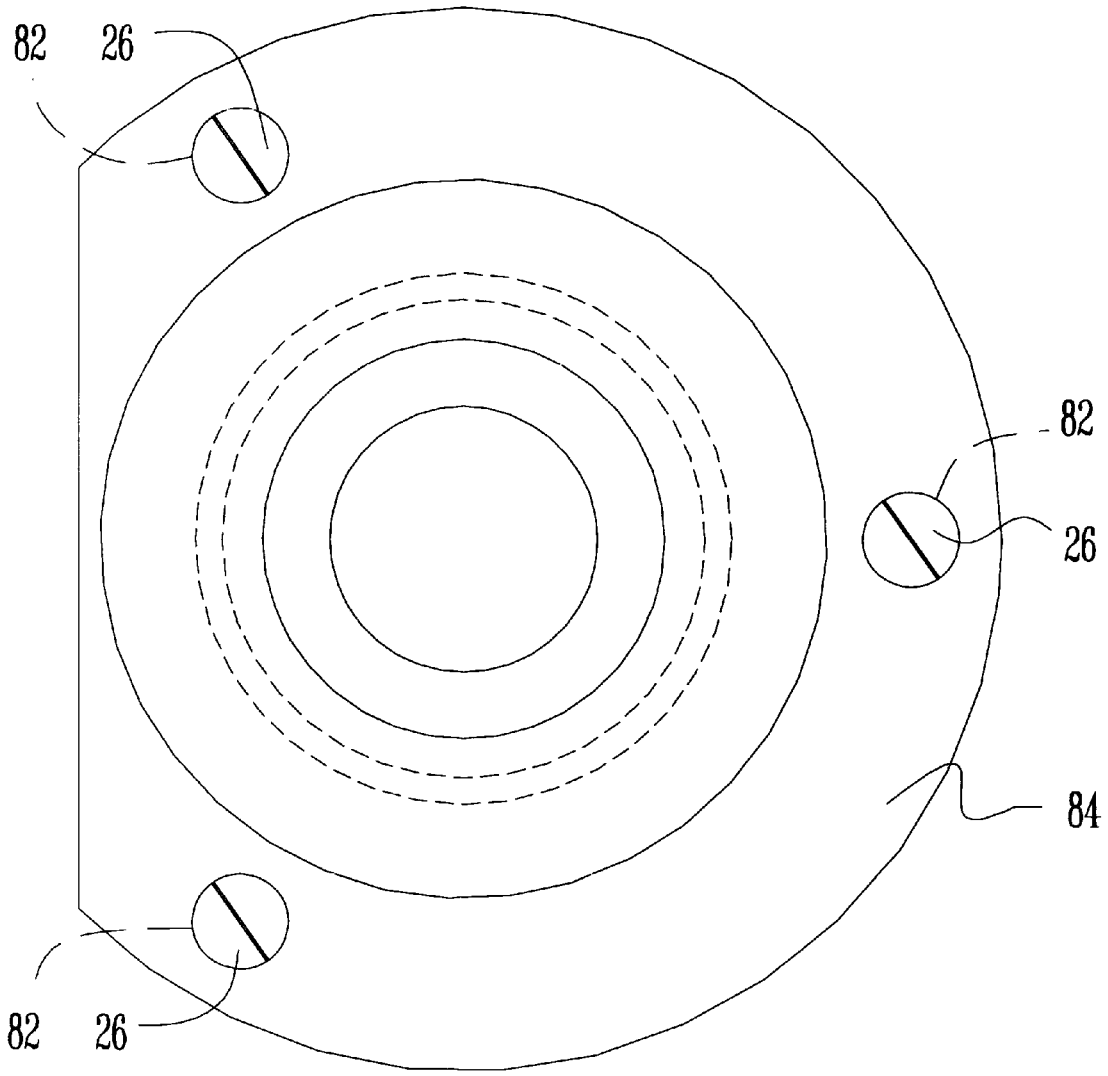
FIG. 5 is a view along lines 5—5 of FIG. 4.

Handle portion 34 is secured to filter housing portion 36 by a plurality of screws 26 which are disposed in holes 82 in flange 84, and which threadedly engage tapped holes in main housing 86 of filter housing portion 36, as can be seen in FIG. 5. Filter housing portion 36 houses rotatable filter wheel 38. Rotatable filter wheel 38 is rotatably mounted within main housing 86 by being supported on a post 88. Rotatable filter wheel 38 is maintained in spaced relationship to the rear wall 90 of main housing 86 by a washer 92.

Figure 6:
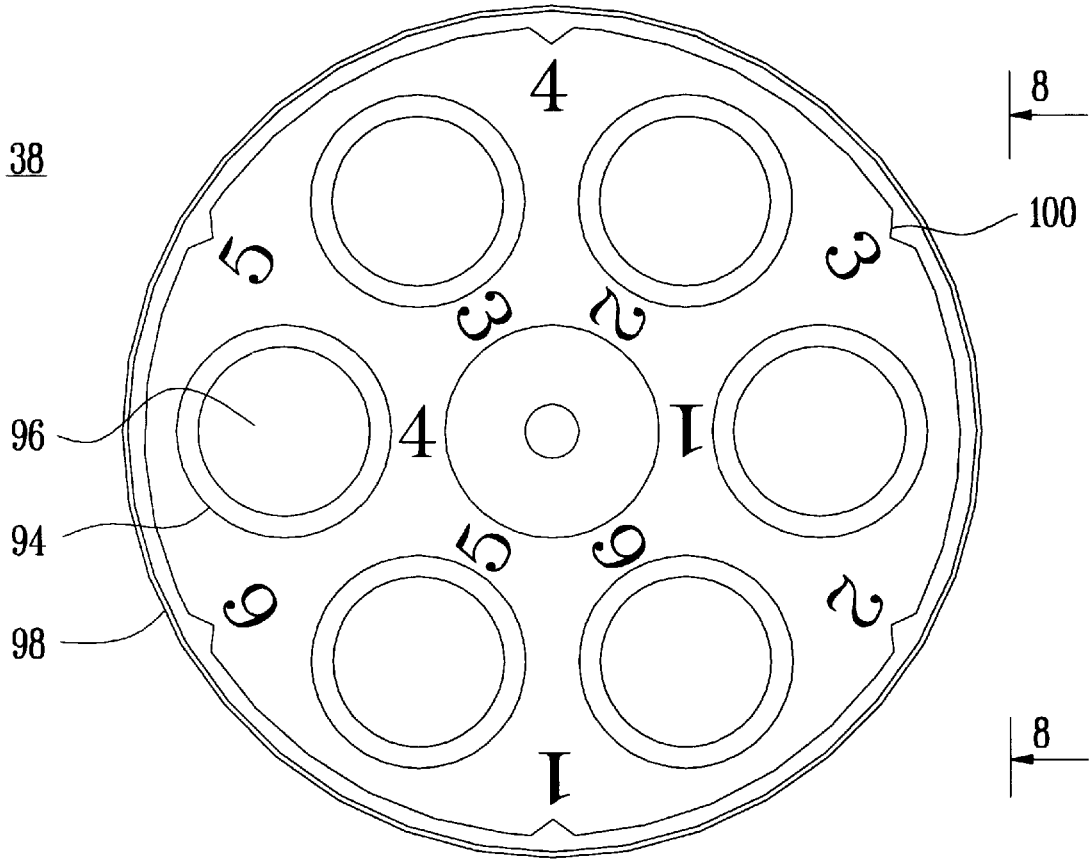
FIG. 6 is a top plan view of the filter wheel of the present invention.

Referring to FIG. 6, the construction of the rotatable filter wheel 38 may be seen. In particular, rotatable filter wheel 38 comprises a plurality of filter receiving openings 94 within which filters 96 are located. The circumferential edge of wheel 38 may be smooth as illustrated in FIG. 6 or may include a knurled surface as is shown in dotted lines in FIG. 6. Such a knurled surface 98 would be disposed around the entire periphery of rotatable filter wheel 38. Rotatable filter wheel 38 also includes a plurality of detentes 100 which are adapted to be engaged by a detente engaging spring member 102, as can be seen most clearly in FIG. 7. Detente engaging spring member 102 is secured by a screw 104 to the inside side wall 106 of main housing 86. It is maintained in place at a location from the inside side wall 106 through the use of a washer 108.

Figure 7:
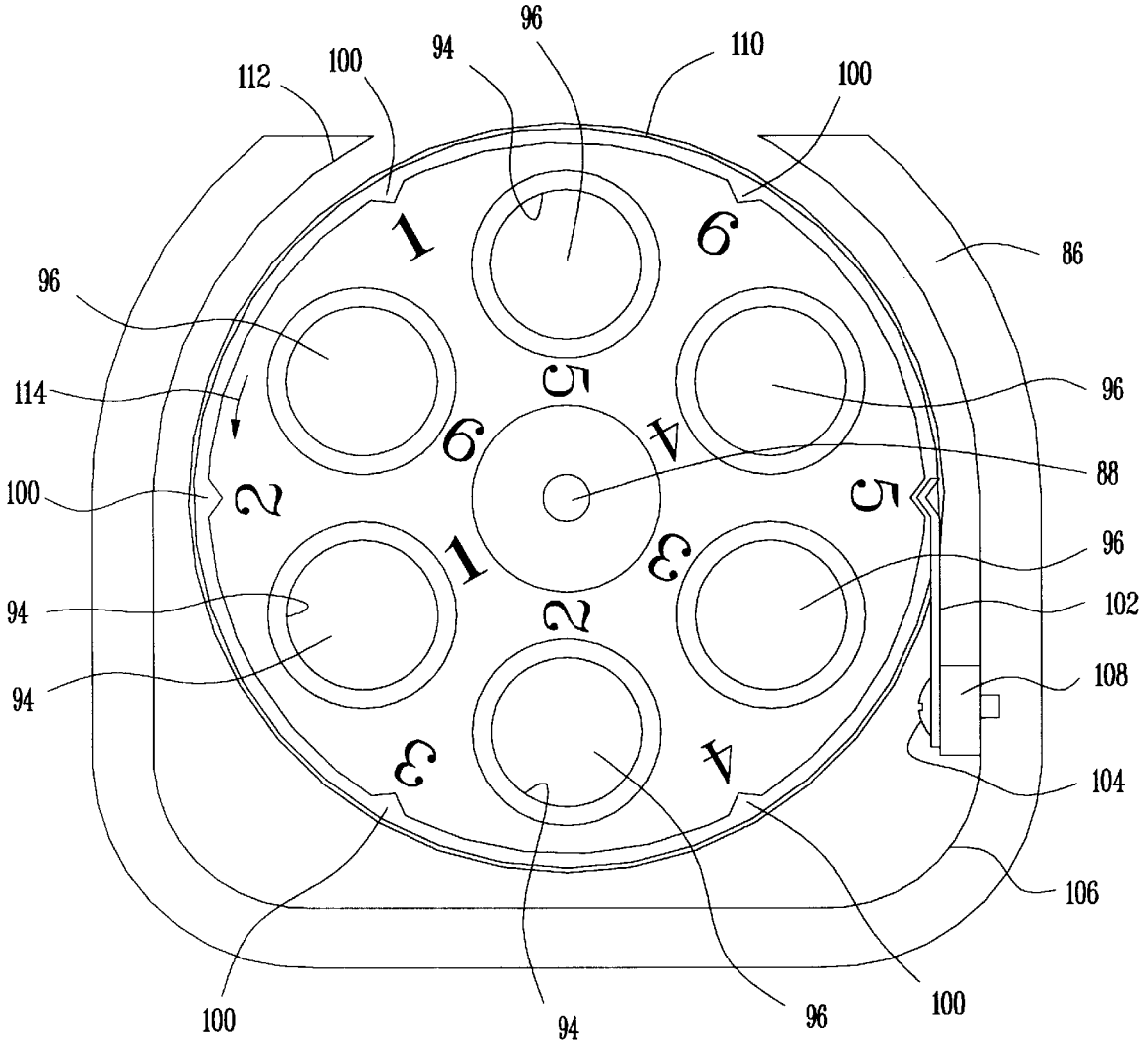
FIG. 7 is a top plan view of the filter wheel of the assembly of the present invention with the cover of the housing removed.

As can be seen in FIG. 7, the circumferential edge 110 of rotatable filter wheel 38 extends through a hole 112 defined in main housing 86 allowing a user to engage the same with his thumb and rotate the rotatable filter wheel to cause engagement with the detente 100 associated with a selected filter 96, by rotation of wheel 38 in the direction indicated by arrow 114.

Figure 8:
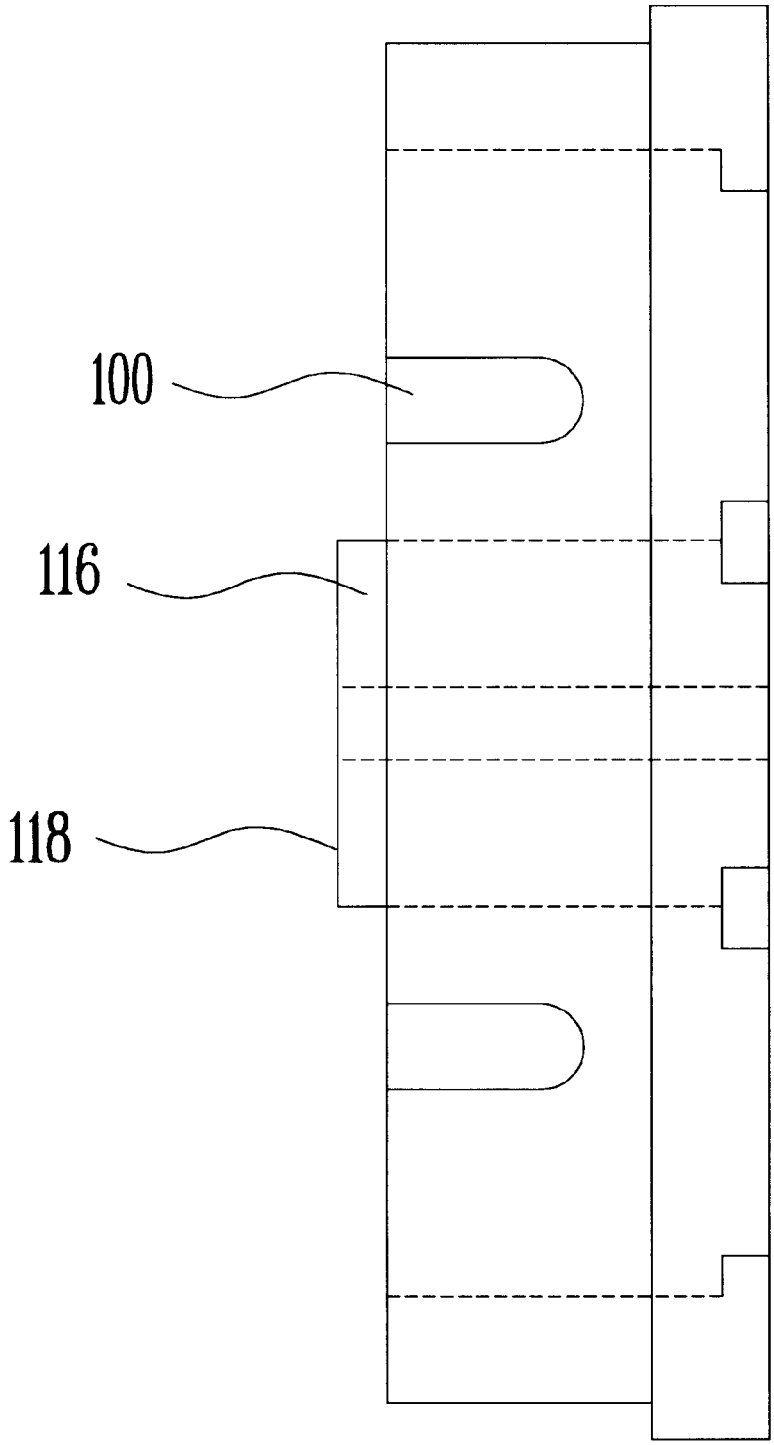
FIG. 8 is a side view along lines 8—8 of FIG. 6.
Figure 9:
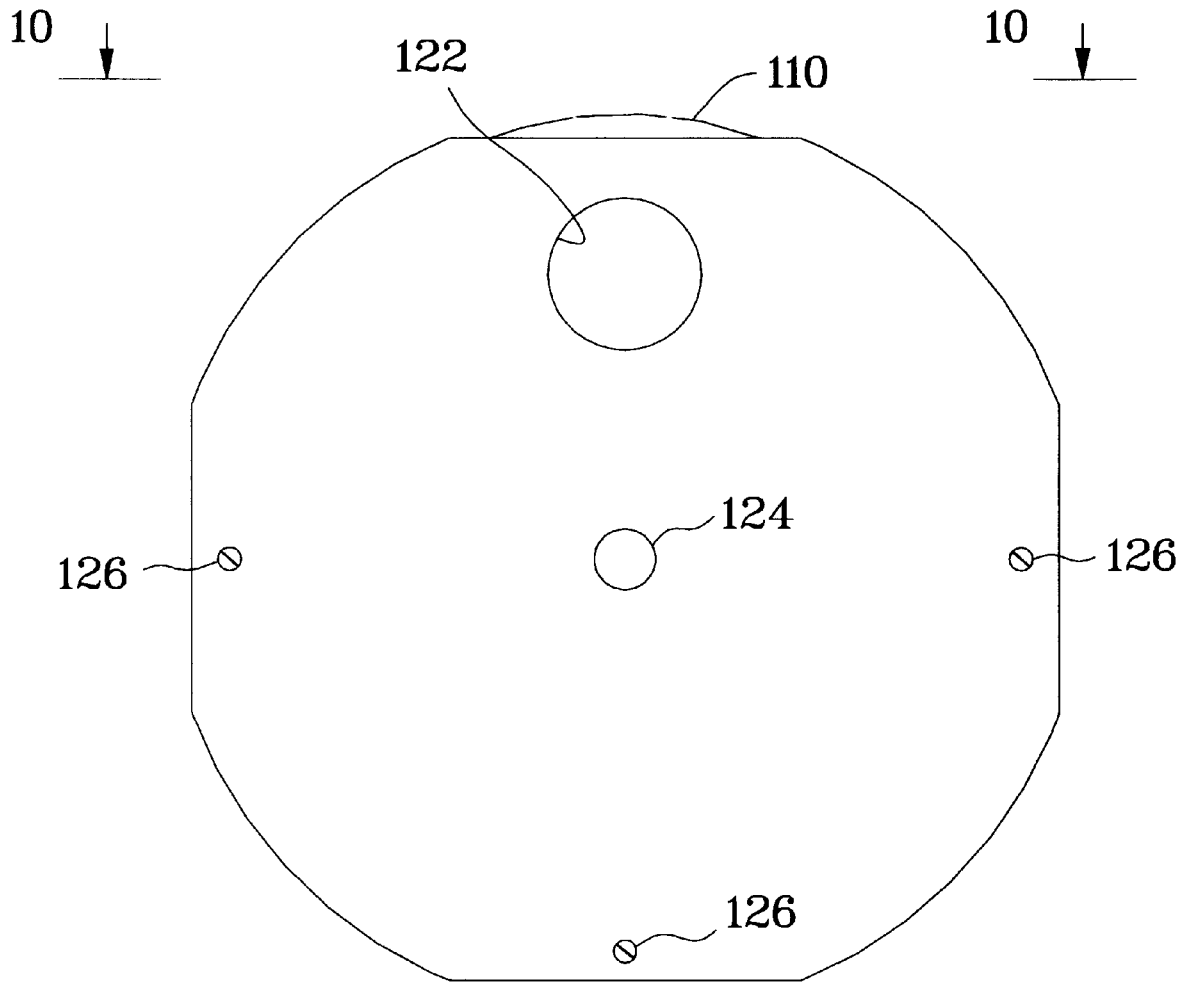
FIG. 9 is a front view of the light directing assembly head of the present invention.

As can be seen most clearly in FIG. 8, spacing from the forward portion of filter housing portion 36 is maintained by an integral central annular shoulder 116 on the rotatable filter wheel. The forward surface 118 of shoulder 116 bears against front plate 120 of housing portion 36. Front plate 120 defines a hole 122 through which light filtered by a selected filter 96 is allowed to pass to illuminate the forensic deposition 44 under examination. As can be seen in FIG. 9, front plate 120 also includes a hole 124 for receiving post 88. Likewise, a plurality of screws 126 are used to secure front plate 120 to the side walls 106 of main housing 86.

Figure 10:
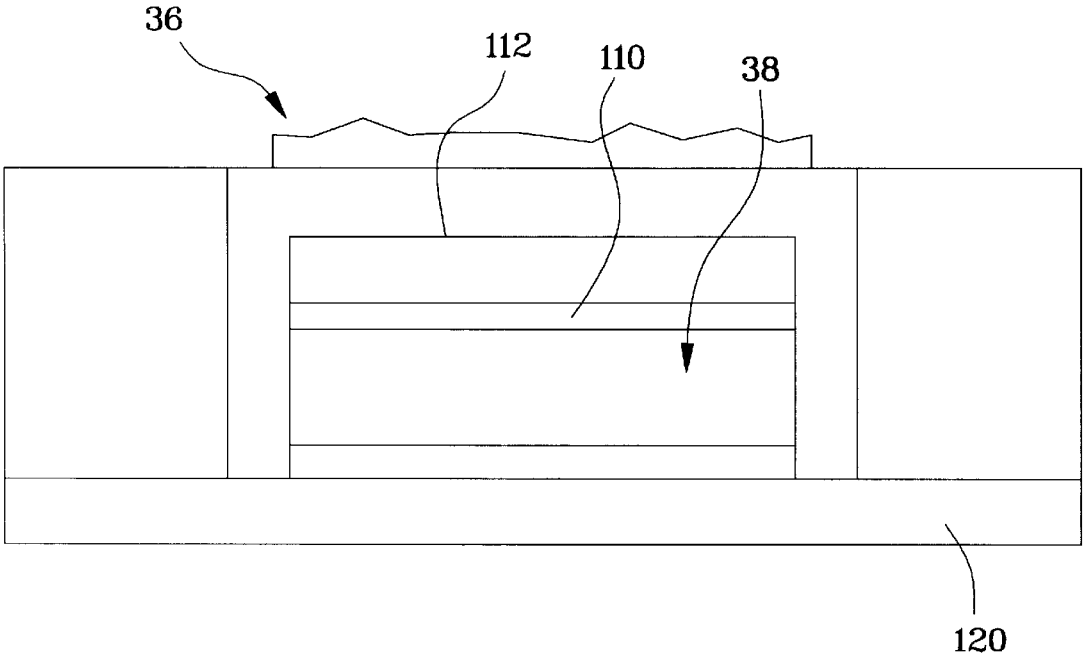
FIG. 10 is a top view along lines 10—10 of FIG. 9.

As can be seen in FIG. 10, circumferential edge 110 of rotatable filter wheel 38 is easily accessible through window 112 for adjustment of a desired filter. The same is of particular interest because during use, the user using a single hand may hold and direct the light source while, at the same time adjusting the filter through which light can pass. In addition, the inventive design is of particular value because the use of a single hand-held light directing assembly frees up the other hand either to hold the light source or to do other tasks such as adjust viewing filters, cameras, painting with developing agents, dusting with appropriate print revealing powders, or the like.

Figure 11:
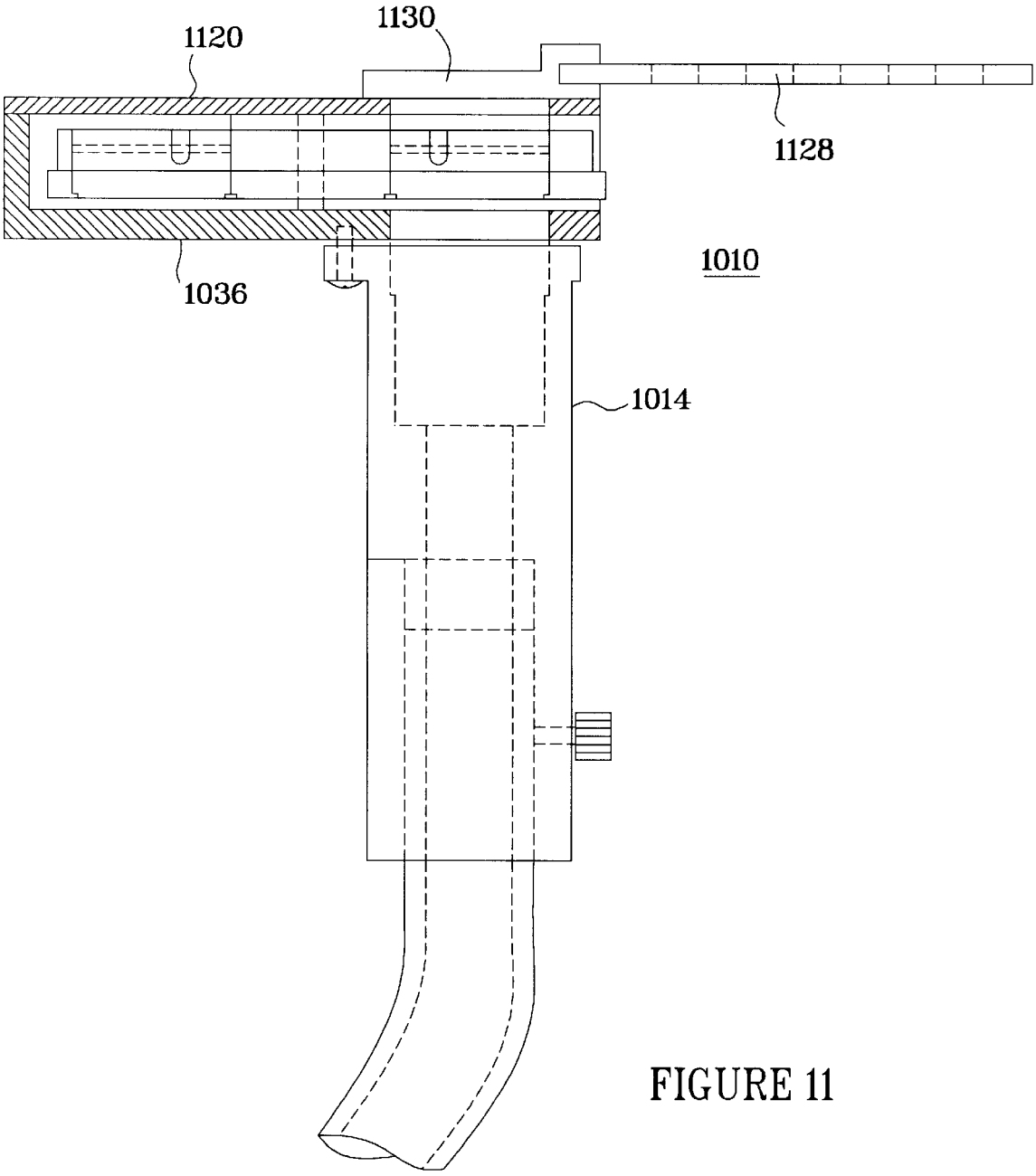
FIGS. 11 and 12 are views similar to the views of FIGS. 4 and 10 of the embodiment of FIGS. 1–10 of an alternative embodiment.
Figure 12:
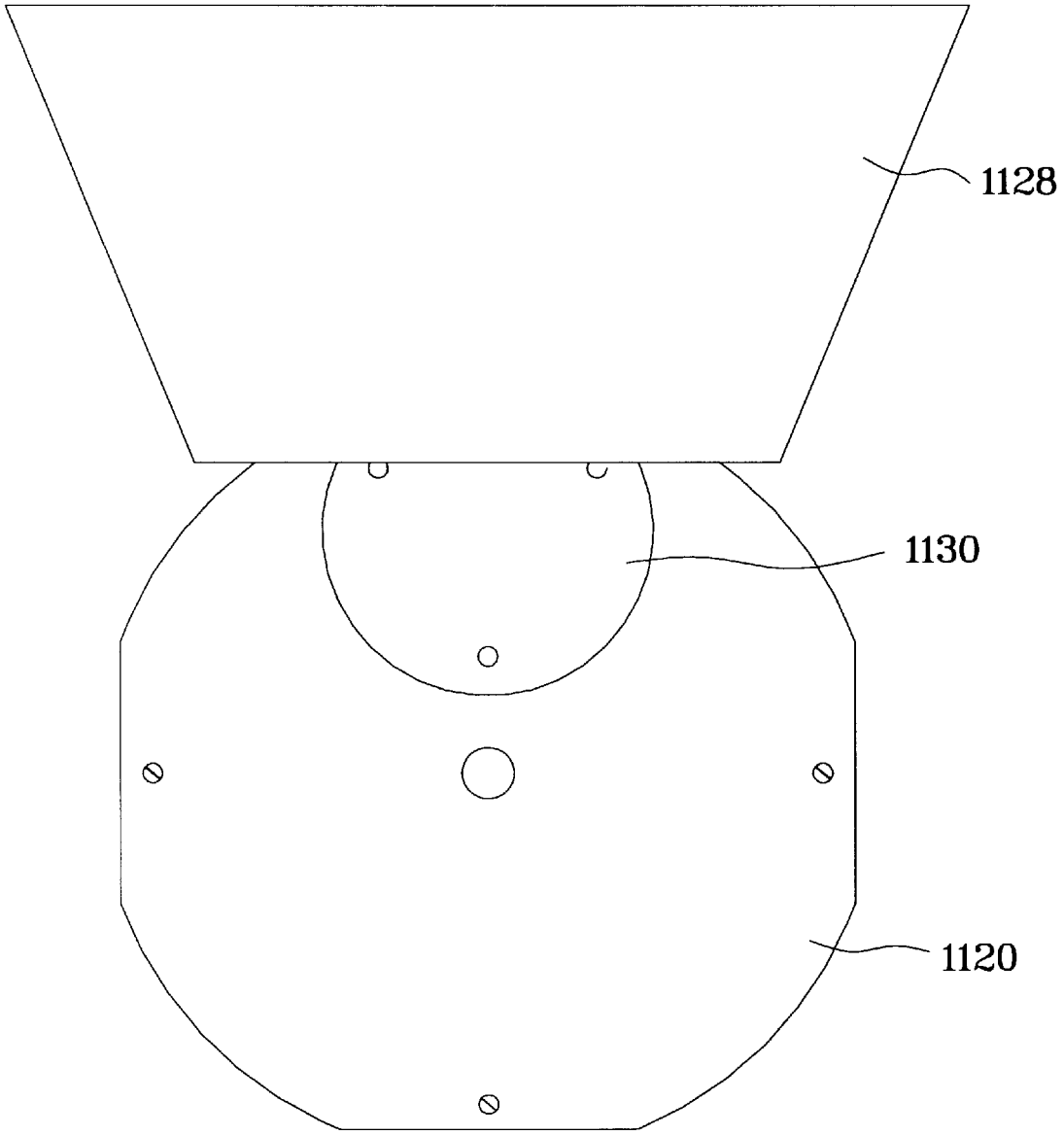

An alternative embodiment is illustrated in FIGS. 11–12. Generally, similar parts or parts performing analogous, corresponding or identical functions to those of the FIGS. 1–10 embodiment are numbered herein with numbers which differ from those of the earlier embodiment, by multiples of one thousand.

An alternative embodiment of the invention is illustrated in FIG. 11. Generally, in this embodiment the hand-held light directing assembly 1014 of system 1010 is of similar construction except that a viewing filter 1128 is secured to the front plate 1120 of filter housing portion 1036 by a supporting bracket 1130 having aperture 1122. During use, as illustrated in phantom lines in FIG. 1, a viewer looks through filter 1128 when inspecting the deposition. In addition, provision may be made for adjustable angular positioning of filter 1128, also as illustrated in phantom lines in FIG. 1. Otherwise operation of the system illustrated in FIG. 11 is identical to that of the system illustrated in FIGS. 1–10. The construction of the filter may be more clearly seen in FIG. 12.

As alluded to the above, the inventive system has numerous advantages. In addition to the flexibility provided to the user through the use of the rotatable filter wheel housing which may be operated to adjust the filter and position of the output light beam, the design also accommodates the variation of the intensity and size of the output light beam. In addition, the system of the present invention has superior intensity output on account of the fact that the filters in the rotatable filter wheel do not have to be protected by heat absorbing filter or heat reflecting mirror as used in conventional forensic light sources. In particular, in conventional sources, the output light from the lamp is reduced in intensity by removal of the infrared portion of the source. This is necessary in order to prevent excessive heat buildup in the filter, which would destroy the filter in a relatively short time.

Another important aspect of the invention is the fact that because the light is first passed through the fiber optic wave guide, no such protective filter is required and the light may be caused to fall directly upon the filters which, instead of being located adjacent to the lamp in the optical wave train, are located at the far end of the fiber optical or liquid optical wave guide. As can be readily understood by those of skill in the art, the flexible optical wave guide does have an attenuation factor. However, because of the placement of the filters at the far output end of the optical wave guide, the additional attenuation factor of the infrared protective filters is avoided. However, because of the fact that light, including a great deal of infrared energy, is passed into the flexible optical wave guide, excessive heat may be caused to be built up within the wave guide, particularly near its input end. Accordingly, the input end is provided with heat-dissipating heat sink.

Figure 13:
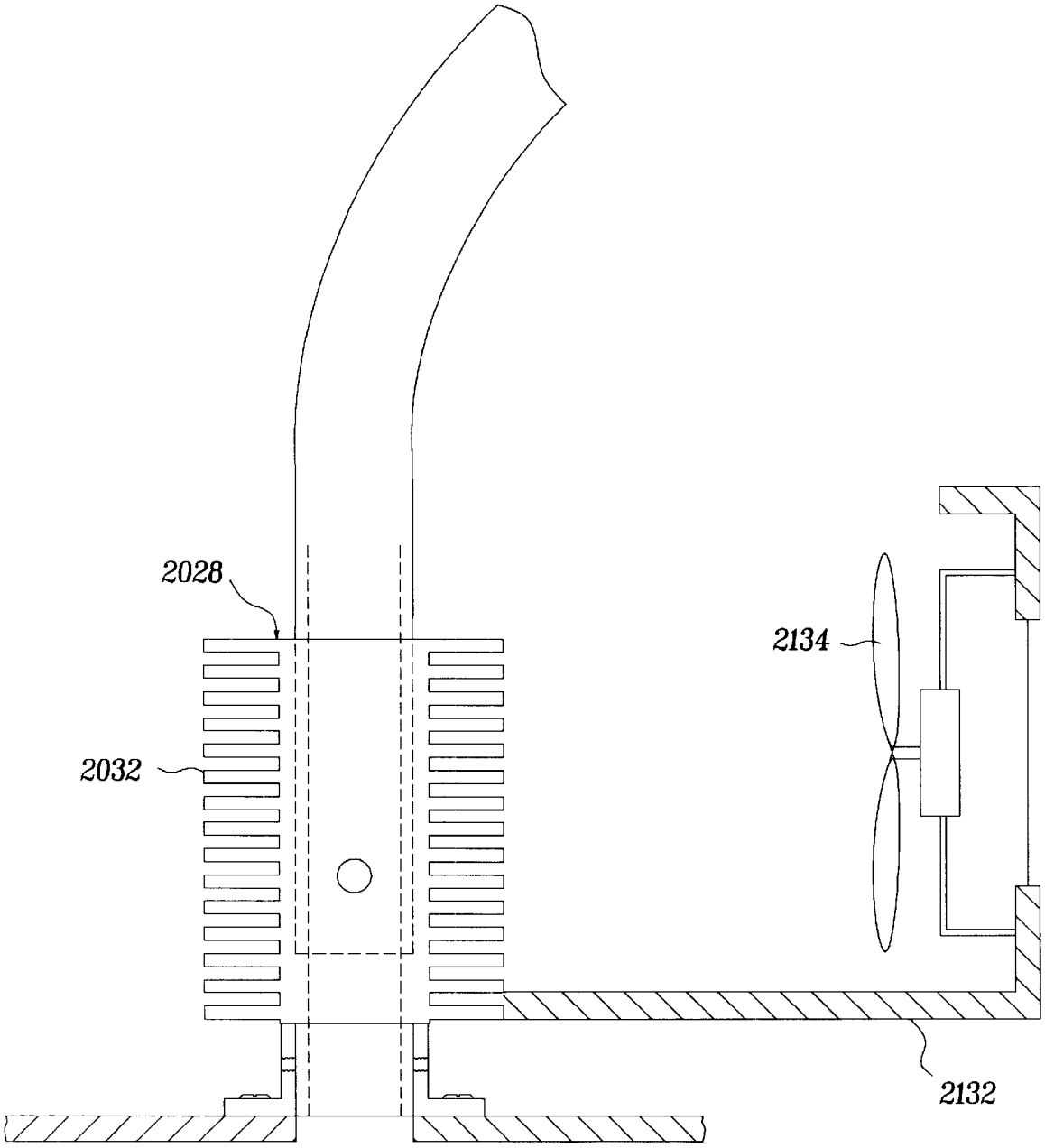
FIG. 13 is a view of yet another alternative embodiment.

In accordance with yet another alternative embodiment illustrated in FIG. 13, the heat sink 2028 is provided with a housing 2132 housing a fan 2134 which blows air over the fins 2032. This results in extreme cooling which of particular value when very high intensity lamp sources are used.

With respect to a possible flexible fiber optic wave guides, a liquid light guide such as one of the type made by Lumatec of Germany is preferred. This particular light guide will absorb infrared rays to a very great extent (almost 100%) while only attenuating the ultraviolet and visible spectrum to the extent of about 50 or 60%. However, a conventional fiber optic wave guide will provide exceptional performance in the case of lower intensity lamps inasmuch as infrared radiation is reduced by approximately 50%. In the case of lower intensity lamps, this reduction is sufficient to prevent damage to the filters in the rotatable filter wheel. However, if high intensity lamps are used, close to 100% attenuation which is substantially an action of infrared radiation will be necessary to prevent damage to the filters and the use of a liquid light guide is required in order to obtain reasonable filter life.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A forensic light source, comprising:

(a) a source of light;

(b) support structure for supporting said source of light;

(c) a light guide having first and second ends, said light guide being coupled to said source of light at said first end to receive light from said source of light and transmit said light to said second end, said light guide being mounted on said support structure;

(d) a filter support member supporting a plurality of filters; and (e) a portable hand holdable and movable light directing assembly mounted on said second end of said light guide, said light directing assembly supporting said filter support member and providing for movement of said filter support member to a plurality of positions, each of said positions corresponding to a coupling of a selected one of said filters to said second end, whereby said light emitting from said second and is filtered by said selected filter while the emitted light is directed to various locations through movement of said light directing assembly.

2. A forensic light source as in claim 1, wherein said filter support member comprises a wheel with a plurality of filters mounted around a point of rotation and said filter support members further comprises a mounting structure configured to rotatably mount said wheel about said point of rotation, and said wheel is positioned to be rotated by a finger of a user.

3. A forensic light source, as in claim 1, wherein said filter support member defines a plurality of detentes and a spring member is mounted on said light directing assembly and positioned to releasably engage one of said detentes, each of said detentes being positioned to correspond to alignment between its respective one of said filters and said second end, when a respective detente is engaged by said spring member, each of said detentes corresponding to a respective one of said filters.

4. A forensic light source as in claim 1, wherein said source of light is a xenon lamp.

5. A forensic light source as in claim 1, wherein said source of light is a tungsten lamp.

6. A forensic light source as in claim 1, wherein said source of light is a metal halide lamp.

7. A forensic light source as in claim 1, further comprising a heat sink coupled to said first end of said light guide.

8. A forensic light source as in claim 7, wherein said light guide is a liquid light guide.

9. A forensic light source as in claim 7, further comprising a lens, said lens positioned to focus said light from said second end through a selected filter.

10. A forensic light source as in claim 1, wherein said light guide is a liquid light guide providing light from said second end through a selected filter.

11. A forensic light source as in claim 10, further comprising a lens positioned to focus light from said second end through a selected filter.

12. A forensic light source as in claim 11, further comprising a heat sink coupled to said first end of said light guide.

13. A forensic light source as in claim 1, wherein said light guide is a fiber optic light guide.

14. A forensic light source as in claim 13, further comprising a heat sink coupled to said first end of said light guide.

15. A forensic light source as in claim 1, further comprising a lens, said lens being positioned to focus said light from said second end through a selected filter.

16. A forensic light source as in claim 15, further comprising a securing member, said securing member providing for an adjustable setting of a position of said second end of said light guide relative to said lens.

17. A forensic light source as in claim 1, wherein said movable light directing assembly comprises a housing portion and a handle portion, said housing portion containing said filter support member and said handle portion being configured and dimensioned to be grasped by a hand of a user.

18. A forensic light source as in claim 17, further comprising a lens positioned to focus light from said second end through a selected filter.

19. A forensic light source as in claim 17, further comprising a securing member, said securing member providing for an adjustable setting of a position of said second end of said light guide relative to a lens.

20. A forensic light source as in claim 17, wherein said housing portion allows the user to rotate said filter support member with the user's thumb while gripping said handle portion and directing the filtered light.

21. A forensic light source, as in claim 20, wherein said filter support member defines a plurality of detentes and a spring member is mounted on said light directing assembly and positioned to releasably engage one of said detentes, each of said detentes being positioned to correspond to alignment between its respective one of said filters and said second end, when a respective detente is engaged by said spring member, each of said detentes corresponding to a respective one of said filters.

22. A forensic light source as in claim 1, wherein said movable light directing assembly comprises a housing portion and a handle portion, said housing portion containing said filter support member and said handle portion being configured and dimensioned to be grasped by a hand of a user.

23. A forensic light source as in claim 22, wherein said housing portion is configured to allow the user to rotate said filter support member while gripping said handle portion and directing the filtered light.

24. A forensic light source, comprising:

(a) a source of light;

(b) a support structure for supporting said source of light;

(c) a light guide having first and second ends, said light guide being coupled to said source of light at said first end to receive light from said source of light and transmit said light to said second end, said light guide being mounted on said support structure;

(d) a filter support member supporting a plurality of filters;

(e) a portable hand holdable and movable light directing assembly coupled to said second end of said light guide, said light directing assembly supporting said filter support member and providing for movement of said filter support member to a plurality of positions, each of said positions corresponding to a coupling of a selected one of said filters to said second end, whereby said light emitting from said second end is filtered by said selected filter while the emitted light is directed to various locations through movement of said light directing assembly; and (f) a heat sink coupled to said first end of said light guide.

25. A forensic light source as in claim 24, wherein said light guide is a liquid light guide for providing light from said second end through a selected filter.

26. A forensic light source as in claim 25, further comprising a lens, said lens positioned to focus said light from said second end through a selected filter.

27. A forensic light source as in claim 24, further comprising a lens positioned to focus light from said second end through a selected filter.

28. A forensic light source as in claim 24, wherein said filter support member comprises a wheel with a plurality of filters mounted around a point of rotation and said filter support member further comprises a mounting structure configured to rotate said wheel about said point of rotation.

29. A forensic light source as in claim 28, wherein said movable light directing assembly comprises a housing portion and a handle portion, said housing portion being substantially circular in shape to contain said wheel and said handle portion being configured and dimensioned to be grasped by a hand of a user.

30. A forensic light source as in claim 29, further comprising a securing member, said securing member providing for an adjustable setting of a position of said second end of said light guide relative to a lens.

*31. A forensic light source comprising:*

*(a) a source of light;*

*(b) a support structure for supporting said source of light;*

*(c) a light guide having first and second ends, said light guide being coupled to said source of light at said first end to receive light from said source of light and transmit said light to said second end, said light guide being mounted on said support structure;*

*(d) a filter support member supporting a plurality of filters, said filter support member being coupled to receive light from said source of light; and*

*(e) a portable hand holdable and movable light directing assembly mounted on said second end of said light guide, said light directing assembly including a hand or finger operable control member coupled to said filter support member and controlling the movement of said filter support member to a plurality of positions, each of said positions corresponding to a coupling of a selected one of said filters to said source of light, whereby said light emitted from said second end is filtered by said selected filter and the emitted light can be directed to a desired location through movement of said light directing assembly by the same hand which operates said control member.*

*32. A forensic light source, as in claim 31, wherein said filter support member defines a plurality of detents and a spring member mounted to act on said detents and positioned to releasably engage one of said detents, each of said detents being positioned to correspond to alignment between its respective one of said filters to said source of light.*

*33. A forensic light source as in claim 31, further comprising a heat sink coupled to said first end of said light guide.*

* * * * *